No. 815,555. PATENTED MAR. 20, 1906.
G. A. PICKUP.
LOOM FOR WEAVING TUBULAR FABRICS.
APPLICATION FILED JULY 29, 1902. RENEWED AUG. 19, 1905.

9 SHEETS—SHEET 1.

WITNESSES:
INVENTOR
George A. Pickup
BY
Henry Connett
ATTORNEY

No. 815,555. PATENTED MAR. 20, 1906.
G. A. PICKUP.
LOOM FOR WEAVING TUBULAR FABRICS.
APPLICATION FILED JULY 29, 1902. RENEWED AUG. 19, 1905.

9 SHEETS—SHEET 3.

WITNESSES:

INVENTOR
George A. Pickup
BY
ATTORNEY

No. 815,555. PATENTED MAR. 20, 1906.
G. A. PICKUP.
LOOM FOR WEAVING TUBULAR FABRICS.
APPLICATION FILED JULY 29, 1902. RENEWED AUG. 19, 1905.
9 SHEETS—SHEET 6.
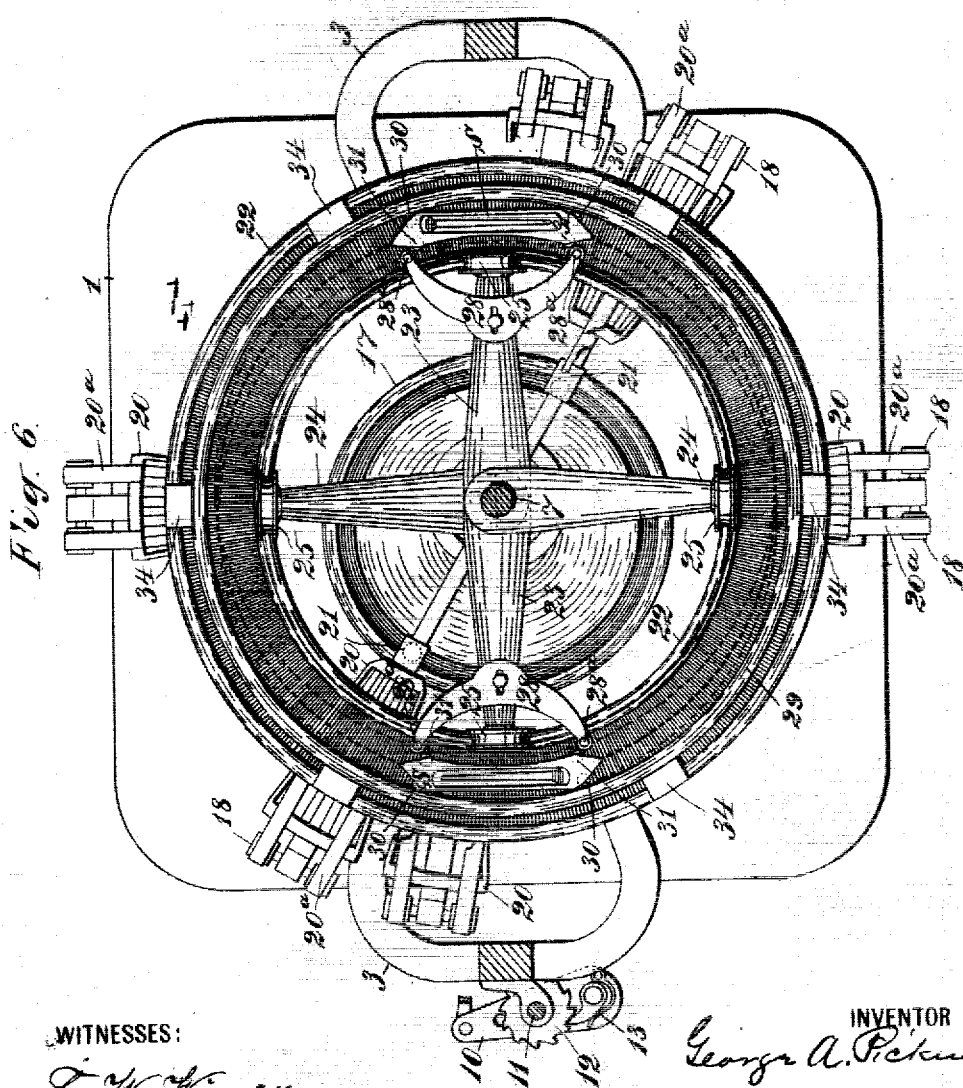
Fig. 6.
WITNESSES:
INVENTOR
George A. Pickup
BY
ATTORNEY

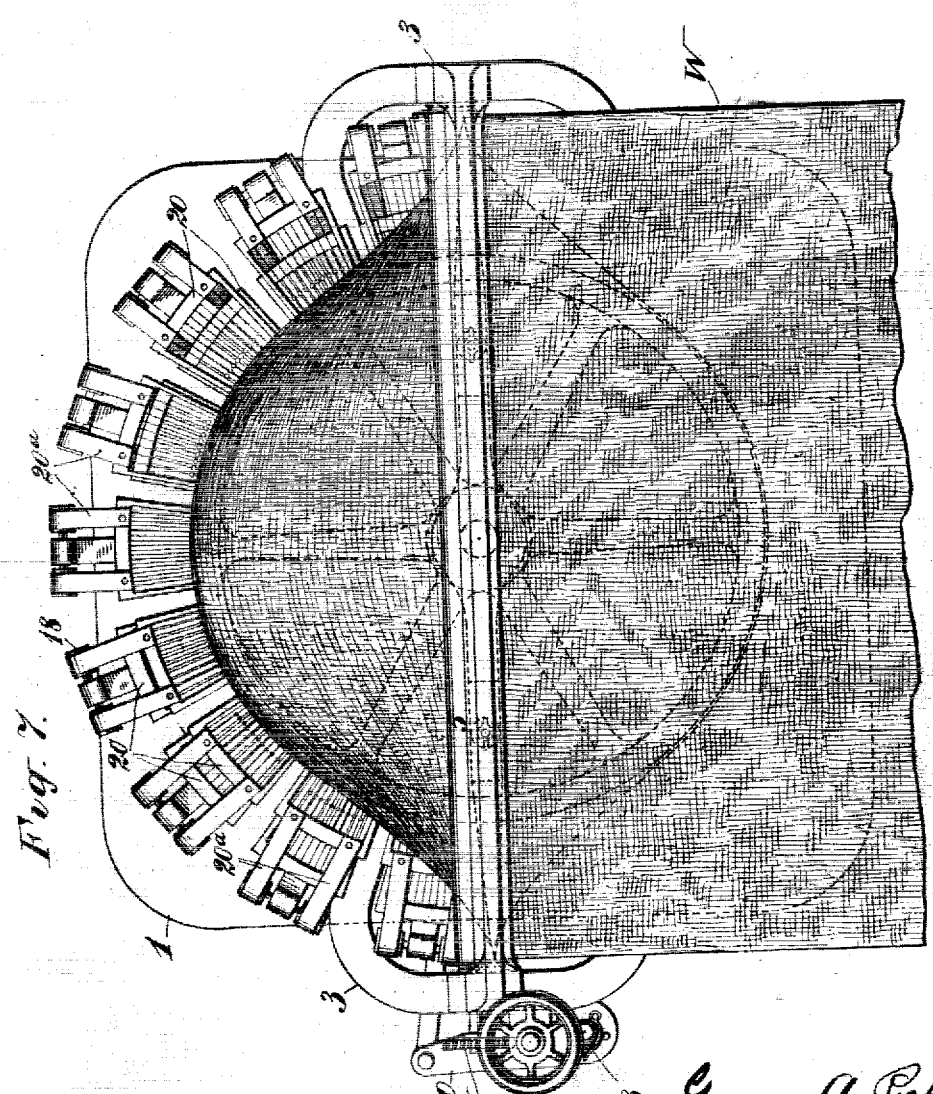

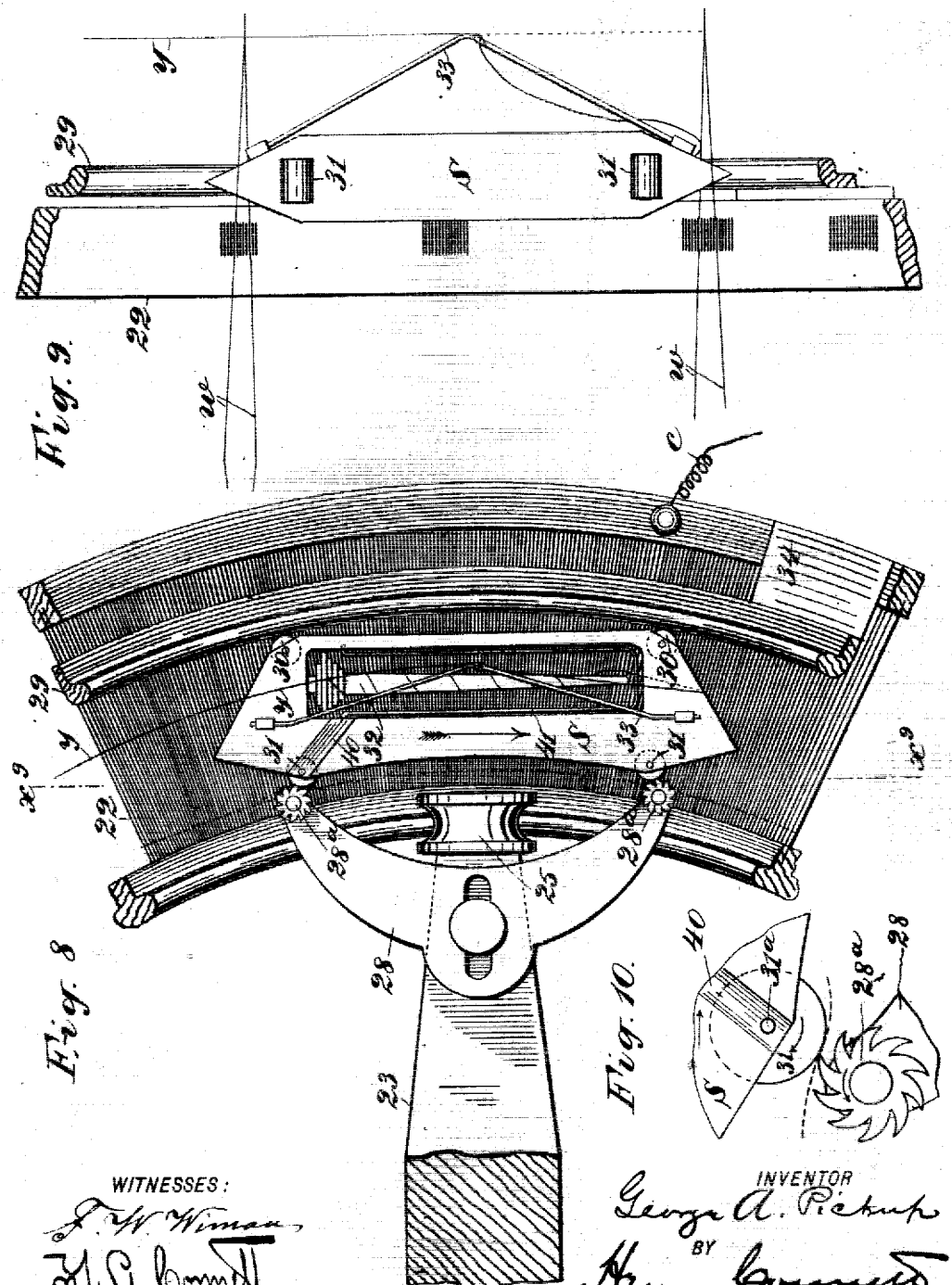

No. 815,555. PATENTED MAR. 20, 1906.
G. A. PICKUP.
LOOM FOR WEAVING TUBULAR FABRICS.
APPLICATION FILED JULY 29, 1902. RENEWED AUG. 19, 1905.
9 SHEETS—SHEET 9.
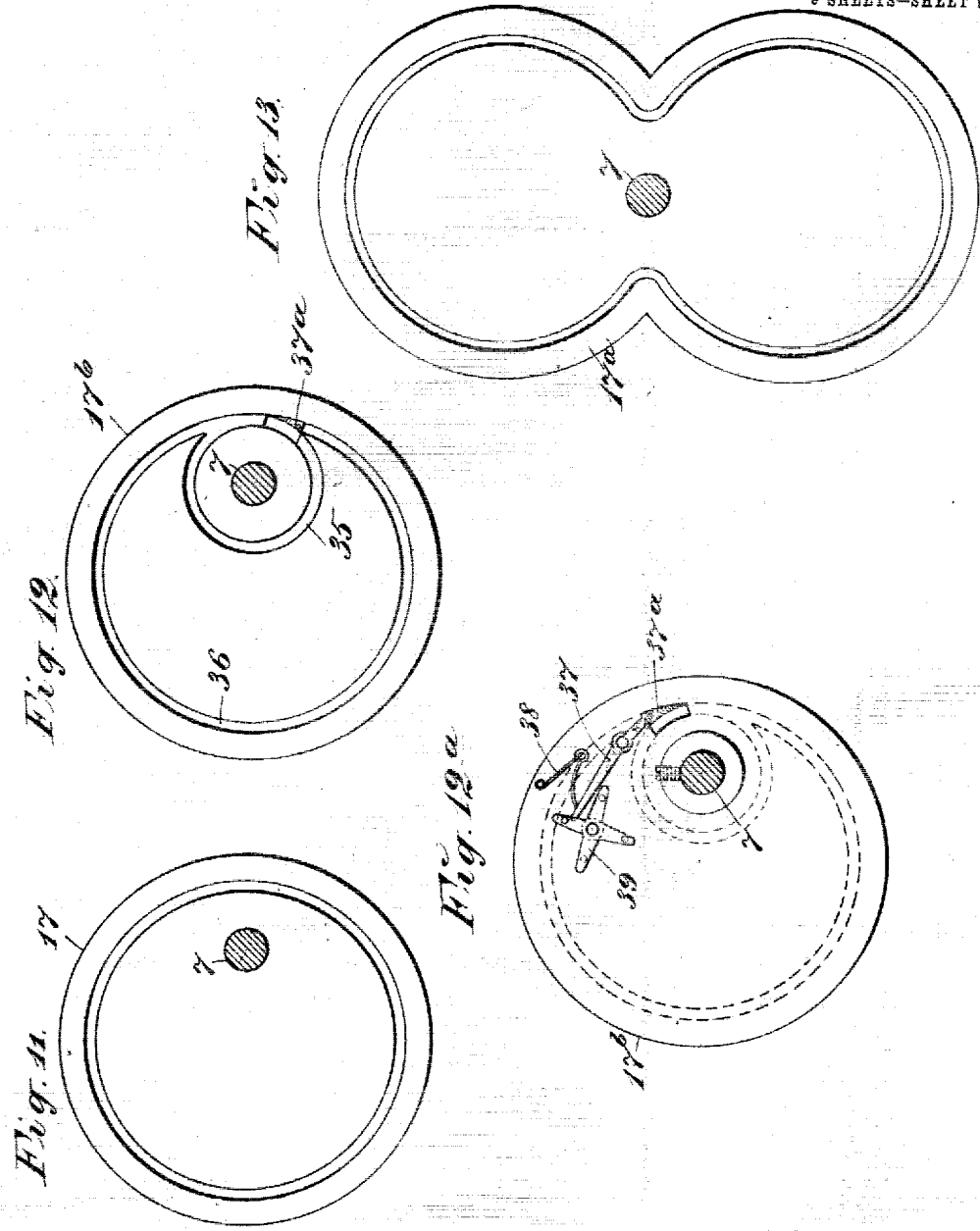

UNITED STATES PATENT OFFICE.

GEORGE A. PICKUP, OF BROOKLYN, NEW YORK.

LOOM FOR WEAVING TUBULAR FABRICS.

No. 815,555.　　　Specification of Letters Patent.　　Patented March 20, 1906.

Application filed July 29, 1902. Renewed August 19, 1905. Serial No. 274,961.

*To all whom it may concern:*

Be it known that I, GEORGE A. PICKUP, a citizen of the United States, residing in the borough of Brooklyn, in the county of Kings, in the city and State of New York, have invented certain new and useful Improvements in Looms for Weaving Tubular Fabrics, of which the following is a specification.

This invention relates to the class of looms for weaving tubular fabrics wherein the shuttle or shuttles are carried about the axis of the loom in an endless path by means within the tube formed by the warps.

Figure 1:
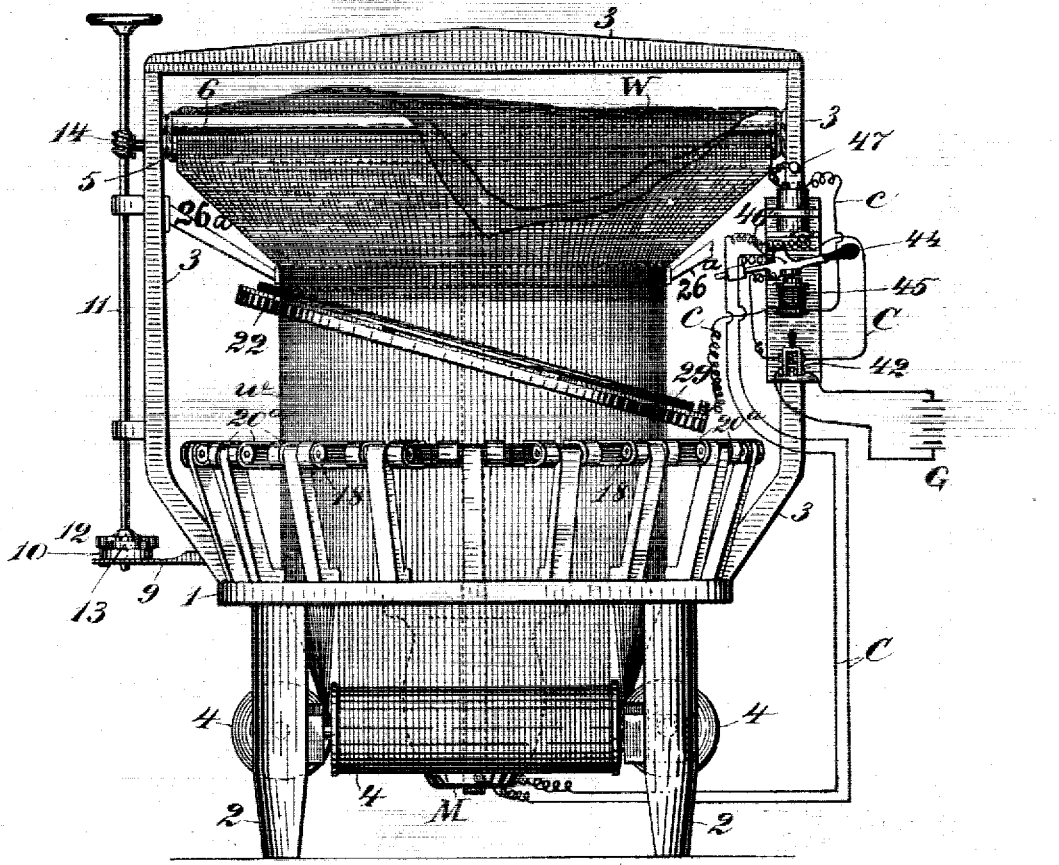
Figure 2:
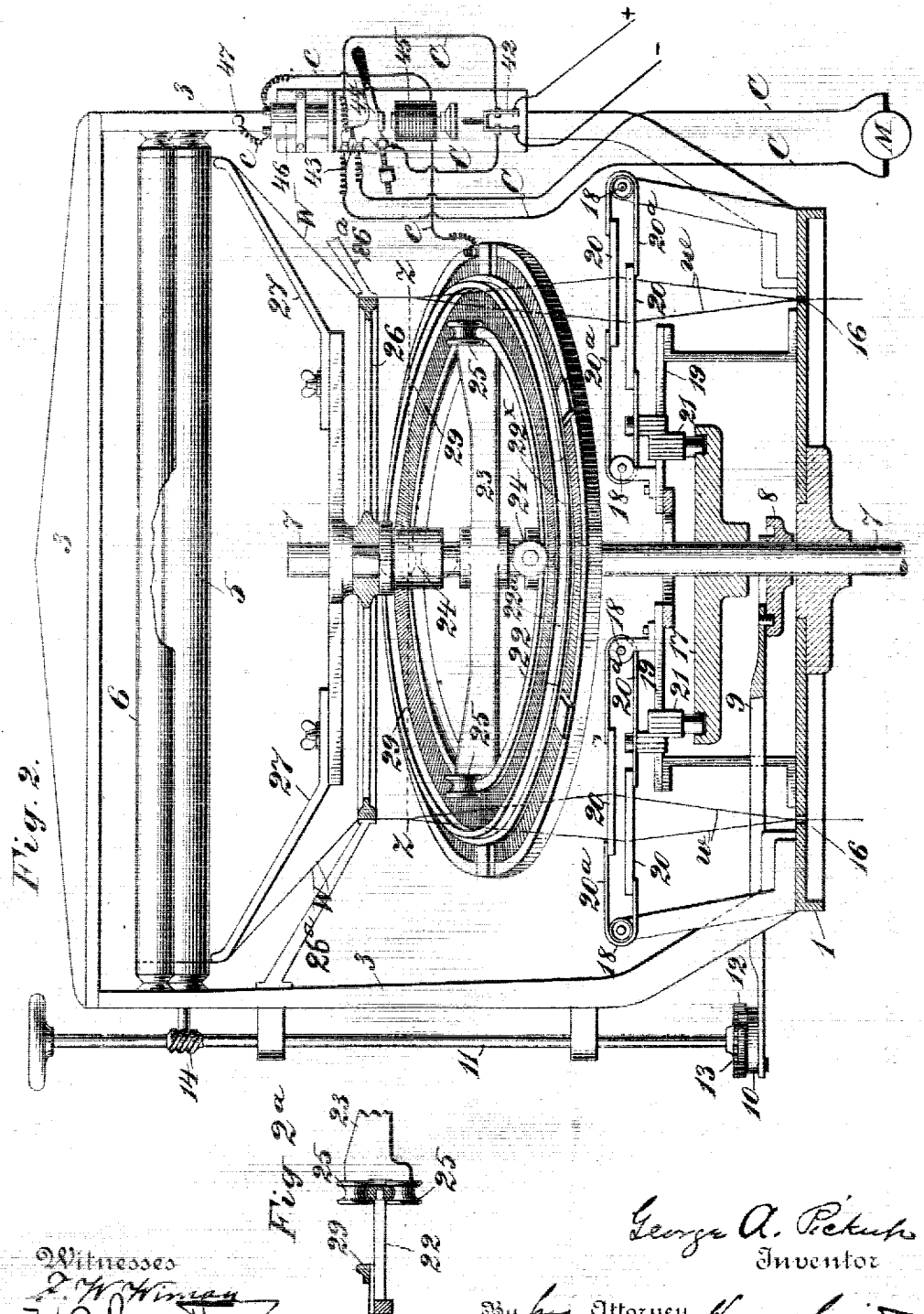
Figure 3:
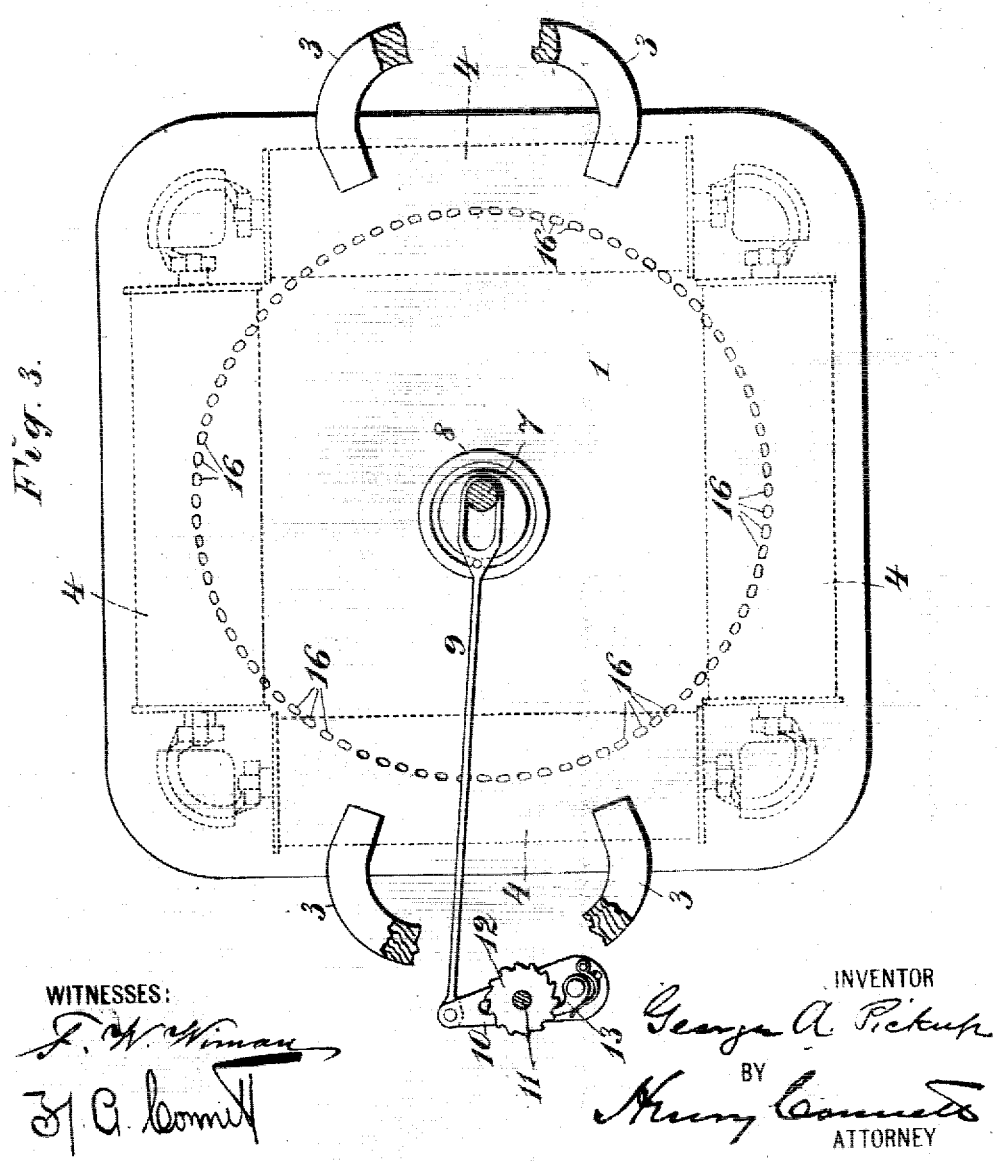
Figure 4:
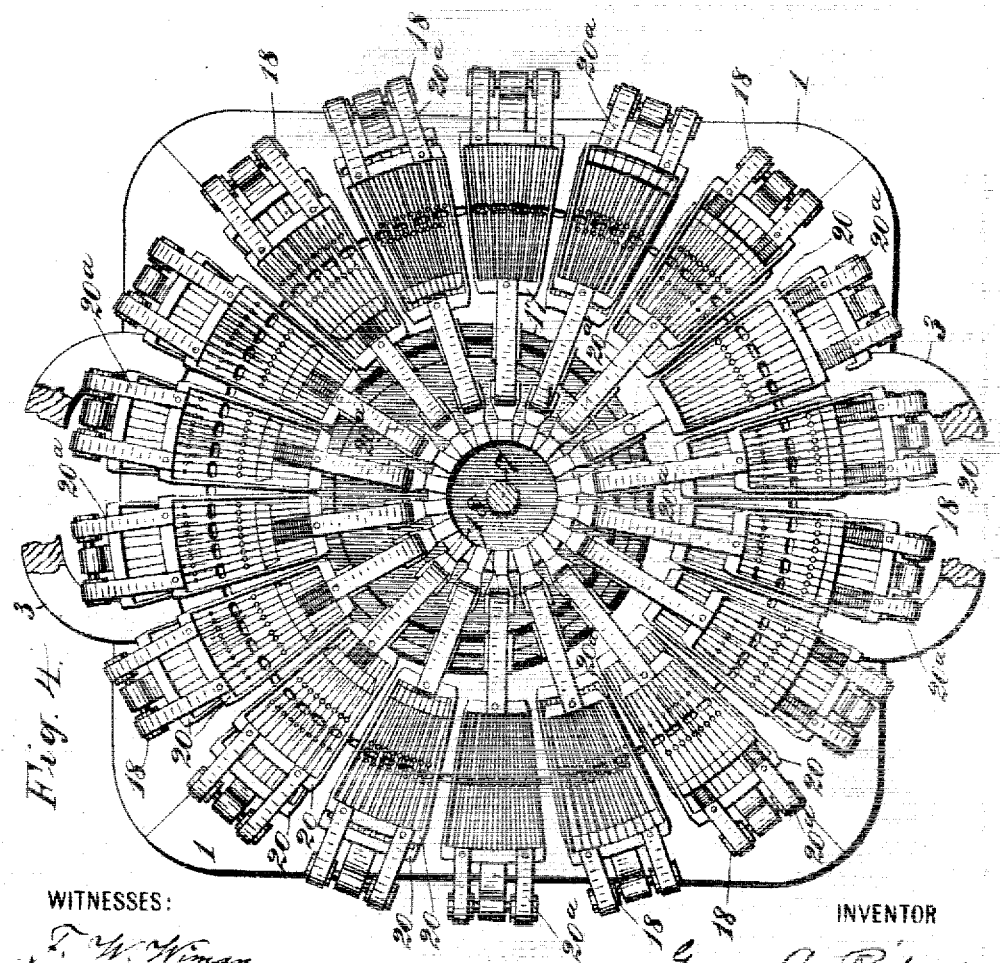
Figure 5:
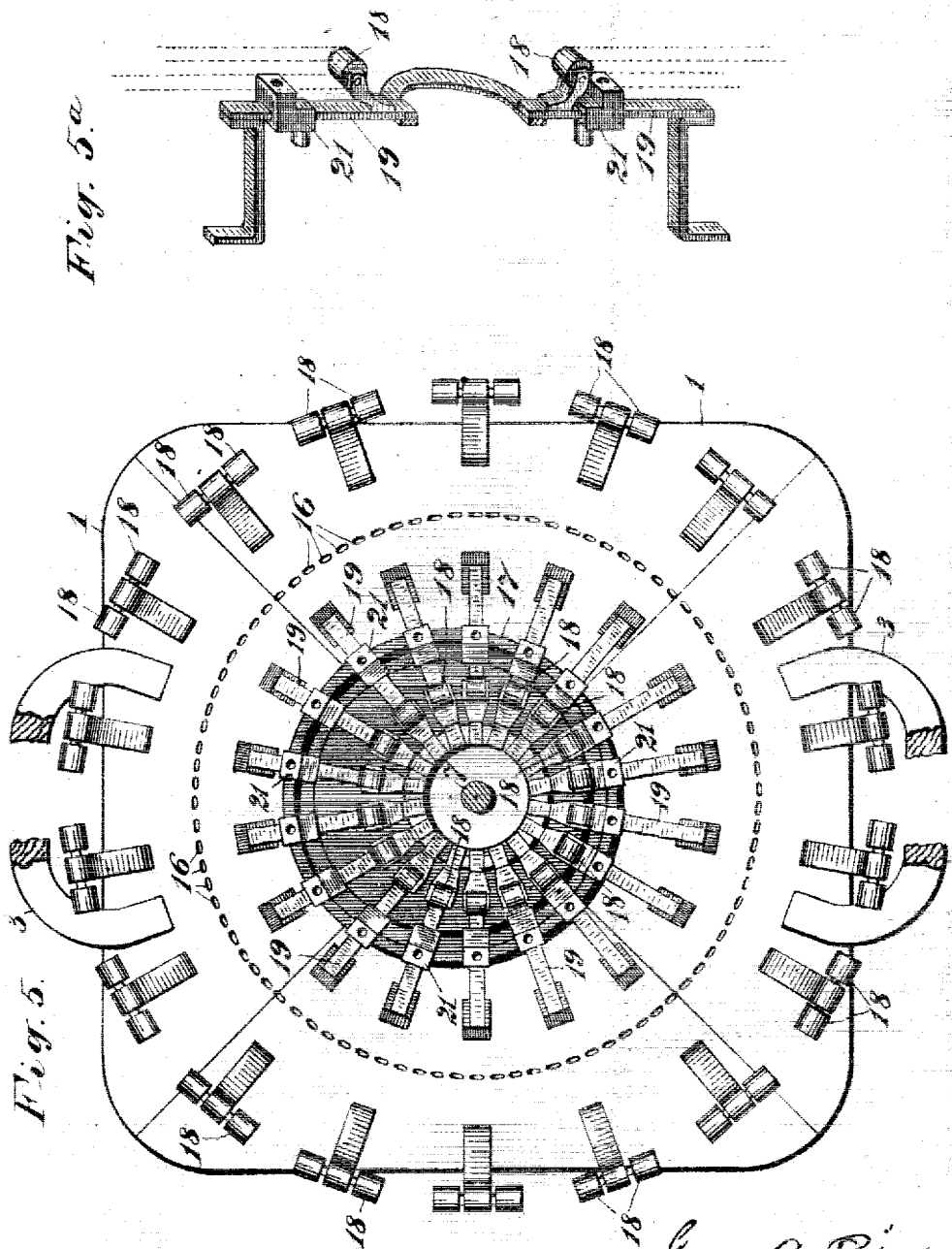

In the accompanying drawings, which illustrate an embodiment of the invention, Figure 1 is an elevation showing the warps and web in place. Fig. 2 is a sectional elevation of the upper part of the loom; and Fig. 2ª is a section of the reed, showing the means for supporting and operating it. Fig. 3 is a plan of the bed or table of the machine. Fig. 4 is a sectional plan taken above the harness and heddles. Fig. 5 is a sectional plan taken in the same plane as Fig. 4, but with the heddles omitted; and Fig. 5ª is a perspective detail view of the supports and guides for the heddles. Fig. 6 is a sectional plan taken above the circular reed. Fig. 7 is a plan of the loom with the web in place. Fig. 8 is a plan, and Fig. 9 a sectional elevation, showing the shuttle and its driving mechanism on a larger scale than the principal views. Fig. 9 shows the reed in section at $x^s$ in Fig. 8. Fig. 10 is a detail view of the shuttle-carrier. Figs. 11, 12, 12ª, and 13 are detached views of heddle-operating cams.

Before proceeding to minutely describe the mechanical construction of the loom it may be stated that it is designed for weaving the fabric in a tubular form, that from one to three shuttles may be employed at one time by using suitable harness-cams, that shuttles of greater yarn-carrying capacity may be employed than are ordinarily used in common looms, and that each loom may have an automatic electrical stop motion and may be run independently by an electric motor, the motors of all the looms in the room or mill being supplied, if desired, from a single generator or dynamo.

1 is the bed or table of the loom, which may be supported on legs 2 of any form.

3 designates generally the frame mounted on the bed 1, and 4 designates the several warp-beams below the table and rotatably mounted in any suitable manner. At the upper part of the frame 3 is rotatively mounted the cloth-roll 5 and sand-roll 6.

In the center or axis of the loom is an upright shaft 7, called the "main" shaft, from which the several movable mechanisms are driven. On this shaft just above the bed 1 is fixed an eccentric 8, Figs. 2 and 3, which imparts, through a connecting-rod 9, a vibrating movement to a pawl-arm 10, mounted to rock about an upright shaft 11. On this shaft 11 is secured a ratchet-wheel 12, and a pawl 13 on the arm 10 engages the teeth of the wheel 12 and at each rotation of the main shaft 7 imparts an intermittent rotary impulse to the shaft 11. On the last-named shaft above is secured a worm or screw 14, which gears with a worm-wheel 15, Fig. 7, on the cloth-roll. This mechanism forms the take-up mechanism for the woven fabric or web.

In the bed 1 is a circular series of apertures 16, Figs. 2 and 3, up through which the parted warps $w$ from the warp-beams are led. These apertures are concentric with the shaft 7, and the warp moves upward through them as the weaving process takes it up.

On the main shaft above the take-up eccentric 8 is secured the harness-cam 17, Fig. 2, and on the bed 1 are secured the supports 18 and guides 19 for the heddles 20. Fig. 5ª shows the frame, supports, and guide detached. The guides 19 extend radially over the bed, and on each is mounted a slide 21, the lower end of which engages a groove in the harness-cam 17, while the upper end is coupled to the heddle-strap 20ª. The circular system of heddles is divided into a plurality of pairs, eighteen as seen in Fig. 4. The two heddles of each pair, as seen in Fig. 2, are coupled together by an outer and inner heddle-strap, and these straps pass over the roller-supports 18.

The circular reed 22 is in the form of a flat ring with radial dents, between which pass the warp-threads coming up from the heddles below. This reed floats and has a peculiar gyratory motion for beating up. The gyratory motion is imparted by two pairs of radial cross-arms 23 and 24, fixed to the main shaft 7. The arms of the pair 23 are on the same level; but those of the pair 24 (see Figs. 2 and 6) are situated one above the pair 23 and the other below it. At their outer ends (see Fig. 2ᵃ) the arms each carry two grooved rollers 25, which embrace the inner rim of the reed. The reed cannot, of course, rotate about the central shaft, being held against rotary movement by the warps; but the arms 23 and 24 are carried around by the shaft 7 and impart to the reed a gyratory movement, the higher roller of the pair 24 carrying it up to the point where the weft-thread, laid by the shuttle, is beaten up. In Fig. 2 this point is indicated by $z$. Above the reed and a short distance above the point $z$ where the web W begins is a ring 26, mounted loose on the main shaft inside of the web. This ring is a shaper to maintain the web at this point of tubular cylindrical form, and above it, also loose on the central shaft, is a spreader 27, adapted to flatten the tubular fabric W, so that it may enter properly between the sand-roll and cloth-roll.

The loom as herein shown is adapted for utilizing two shuttles S, as indicated in Fig. 6, and these latter are carried around by suitable shuttle-carriers 28 on the respective arms of the pair of arms 23.

Mounted on and concentric with the reed 22 is a circular track 29, which may be called the "shuttle-race" and along which the shuttle runs. The shuttle and its carrier will now be specifically described with especial reference to Figs. 8 and 9, the latter showing the reed in section at line $x^9$ in Fig. 8 and the shuttle in side elevation. In these views the shuttle-body has two outer rollers 30 to bear and roll along the circular race 29 and two inner rollers 31, which are impinged upon by the arms of the shuttle-carrier 28. It will of course be understood that in weaving the shuttle moves through a shed formed in the warps as it advances and that one set of warps is interposed between the rollers 30 and the race 29, while the other set of warps is interposed between the rollers 31 and toothed rollers 28ᵃ on the carrier 28. The rollers 28ᵃ are spaced a little wider apart than the rollers 31 on the shuttle in order that the latter may enter a little between the former, and thus enable the carrier to move the shuttle around through the shed. The purpose of the toothed rollers on the carrier is to allow the latter to get a proper hold on the shuttle between the interposed warp-threads by parting and slightly bunching or massing the threads. This result is effected by the teeth on the wheels 28ᵃ, which latter rotate so as to clear themselves from the warp-threads and prevent injury to the latter. It will be noted that the teeth of the wheel 28ᵃ are ratchet-like—that is, they are rounded at the back and straight on their faces, as indicated in the enlarged detail view, Fig. 10. As the shuttle advances the wheels rotate, as indicated by the arrows thereon in the last-named figure. The shuttle has in it a recess or aperture in which is mounted the usual bobbin or weft-holder 32. From this holder the weft-thread is led out through a thread-eye in the shuttle. When more than one shuttle is in play, the leading shuttle or shuttles will have means for elevating the weft-thread $y$ as it is laid, so as to enable the harness to form another shed in the warp for the shuttle following. In Figs. 8 and 9 the shuttle is shown provided with this elevated guide 33, the elevated weft or filling thread $y$ being shown clearly in Fig. 9. The last or following shuttle requires no guide 33, it being followed by the reed at its beating-up point, where the combined warp or filling threads are beat up along the line $z$ to form the tubular web or fabric W. It need only be said of the operation of the reed 22 that at each rotation of the shaft 7 every point in the circular reed is brought up to the line $z$ for beating up the warp thread or threads laid by the shuttle or shuttles. The raceway 29 is held firmly in place by clips 34, so as to resist the centrifugal force by which the rapidly-revolving shuttles are thrown against it. A section of this raceway (indicated at 22ˣ in Fig. 2) may be made removable, so as to facilitate the removal of the shuttles. It is not important what means are employed for securing this section in place. It may be hinged to the main portion at one end, if desired.

Fig. 11 is a plan view, detached, of the cam for operating the heddles when two shuttles are employed. Fig. 12 shows a cam suited for operating the heddles when but one shuttle is employed, and Fig. 13 shows a cam suited for operating the heddles when three shuttles are employed. The cam of Fig. 11 is a simple eccentric, and it is set with reference to the arms carrying the two shuttles, as seen in Fig. 6. The cam-groove in this cam 17 actuates the slides 21 to produce two extreme openings or sheds in the warp for the shuttles. The cam 17ᵃ in Fig. 13 is of a double or "figure 8" form, and the groove therein forms four extreme openings or sheds in the warps. The cam 17ᵇ of Fig. 12 for one shuttle is somewhat more complex than the other two and requires the coöperation of other parts. This cam has in its upper face two intersecting circular cam-grooves 35 and 36, the former being small and concentric with the cam-shaft and the other eccentric and in all respects like the groove in the cam 17 of Fig. 11. The roller on the lower side of the slide 21 which engages the groove in the cam will traverse each of the grooves 35 and 36 alternately, being switched from one to the other at their intersection by means seen in Fig. 12ᵃ, which is a bottom or back view of the cam 17ᵇ. This switch device comprises a lever-like switch-tongue 37, the head 37ᵃ of which extends up into the said grooves at their intersection, a spirng 38 to hold said tongue in one of its two positions, and a rotating four-pointed-star cam 17, adapted, when turned a quarter way round, to push over the switch-tongue and let it back. At each revolution of the shaft 7 this star cam is turned a quarter way round by a suitable stud in its path on the loom-frame. This stud is not shown in the drawings, as the cam 17ʰ is not used therein; but the use and application of such a stud will be obvious to any one skilled in mechanics.

The loom may be driven by an electric motor M, (seen in Fig. 1,) the armature of the motor being, if desired, secured on the shaft 7. This motor may be driven from any generator G (seen in Fig. 1) through a circuit C. This circuit has in it a brake controlled by an automatic filling stop motion which will now be described with especial reference to Figs. 1, 2, and 8.

The reed 22 is electrically insulated from the other metal parts of the loom; but the toothed wheel 29ᵃ, which is of metal, makes metallic contact with the metal roller 31 on the shuttle S, the body of which is of wood or other non-metallic substance. The iron axis or arbor (31ᵃ in Fig. 10) of the roller 31 is in metallic contact with a metal strip 40, set in the shuttle-body, and this strip is in contact at all times with a metal drop-lever or hinged bail 41 on the shuttle. This bail may, if left free, drop onto the metal dents of the reed 22, thus establishing electric contact with the reed; but when the weft-thread y from the bobbin is intact this thread which takes under the bail 41 lifts and holds the bail out of contact with the reed, thus maintaining a break in the operating electric circuit of the stop motion.

It may be well to explain here that the motor-circuit C has in it a switch 42, by which it may be broken by the weaver for stopping the loom, and that there is in said circuit another break at 43, held closed by a weighted armature-lever 44. An electromagnet 45 is adapted to break the motor-circuit at 43 by attracting its armature carried by the weighted lever 44. This electromagnet has its coil in a circuit c, called the "controlling-circuit," and which has in it a battery 46. This controlling-circuit is grounded in the metal loom-frame 3 at 47 and from this point the current flows to the shuttle and the bail 41, and when this bail drops into contact with the reed 22 the current is completed through the magnet 45 and the motor-circuit is thus broken.

This invention is not restricted to all the specific details of construction herein shown, as these may be changed to some extent, or equivalents may be substituted, without departing materially from the invention.

Where the spreader 27 acts on the web W, it is liable to strain it outward and away from the former 26, and to prevent this there may be on the loom-frame at these points holders 26ᵃ, as seen in Figs. 1 and 2. These may be of any convenient form.

Having thus described my invention, I claim—

1. A loom for weaving tubular fabrics, having a horizontal bed with apertures, arranged in a circle, for the upright warp-threads, warp-beams below said bed, an upright main shaft concentric with the warps, means for driving said shaft, means above for taking up the cloth, a circular former and spreader for the tubular fabric, radially-disposed heddles, means between the main shaft and the heddles for operating the latter, a circular reed above the heddles, radial arms provided with means for imparting a positive gyratory movement to said reed, and shuttle-carriers on the said arms.

2. A loom for weaving tubular fabrics, having means for carrying upright tubular warps, radially-disposed heddles for forming successive sheds in the warps, means for operating said heddles, an upright rotating shaft in the axis of the tubular warps, means below the heddles for carrying the warps, a cloth-roll and sand-roll above, means driven from the main shaft for imparting an intermittent rotary motion to the cloth-roll, a circular former and spreader for the woven fabric, a circular, gyrating reed above the heddles and having on it a race for the shuttles, means for carrying and imparting a positive motion to said reed, and means for driving the shuttles about said race.

3. A loom for weaving tubular fabrics, having a horizontal bed with apertures in it for the upright warp-threads, warp-beams below said bed, an upright, main shaft concentric with the warps, means for driving said shaft, a cloth-roll and sand-roll above, means driven from the main shaft for imparting an intermittent rotary motion to the cloth-roll, a circular former and spreader for the tubular fabric, radially-disposed heddles, a cam on the main shaft and intermediate mechanisms for operating the heddles, a circular reed above the heddles, radial arms, with rollers, on the main shaft, for imparting a gyratory motion to the reed as the shaft rotates, shuttle-carriers on said arms, and shuttles, mounted on said reed.

4. A loom for weaving tubular fabrics, having an upright shaft, a circular reed, and arms 23 and 24 mounted radially on said shaft and engaging said reed, the two arms 23 being disposed one below and one above the level of the arms 24 so as to impart a gyratory movement to the non-rotating reed.

5. A loom for weaving tubular fabrics, having a circular reed with a raceway on its upper face for the shuttle; a shuttle having rollers 31 on its inner face, a rotating upright shaft disposed in the center of said reed, and a shuttle-carrier on said shaft provided with loosely-rotating toothed wheels 28ᵃ which engage the rollers 31 on the shuttle for driving.

In witness whereof I have hereunto signed my name, this 1st day of July, 1902, in the presence of two subscribing witnesses.

GEORGE A. PICKUP.

Witnesses:
 HENRY CONNETT,
 PETER A. ROSS.